United States Patent
Tanaka

(10) Patent No.: US 11,402,920 B2
(45) Date of Patent: Aug. 2, 2022

(54) GESTURE RECOGNITION METHOD AND GESTURE RECOGNITION DEVICE HAVING A PLURALITY OF RADIO WAVE SENSORS ASSOCIATED WITH A GESTURE OCCURRENCE AREA

(71) Applicant: SOCIONEXT INC., Kanagawa (JP)

(72) Inventor: Tetsuya Tanaka, Yokohama (JP)

(73) Assignee: SOCIONEXT INC., Kanagawa (JP)

( * ) Notice: Subject to any disclaimer, the term of this patent is extended or adjusted under 35 U.S.C. 154(b) by 65 days.

(21) Appl. No.: 17/069,142

(22) Filed: Oct. 13, 2020

(65) Prior Publication Data
US 2021/0026458 A1    Jan. 28, 2021

Related U.S. Application Data

(63) Continuation of application No. PCT/JP2018/015906, filed on Apr. 17, 2018.

(51) Int. Cl.
*G06F 3/01* (2006.01)
*H04B 17/27* (2015.01)
*G06F 3/16* (2006.01)

(52) U.S. Cl.
CPC .............. *G06F 3/017* (2013.01); *G06F 3/165* (2013.01); *H04B 17/27* (2015.01)

(58) Field of Classification Search
CPC ........ G06F 3/017; G06F 3/165; G06F 1/1694; H04B 17/27; G01S 13/88; G01S 5/04; A61B 5/1123; A61B 5/6887; E05F 15/622
See application file for complete search history.

(56) References Cited

U.S. PATENT DOCUMENTS

| | | | |
|---|---|---|---|
| 9,575,560 B2 | 2/2017 | Poupyrev et al. | |
| 9,811,164 B2 | 11/2017 | Poupyrev | |
| 2015/0277569 A1* | 10/2015 | Sprenger | G06F 3/017 345/156 |
| 2015/0293647 A1* | 10/2015 | Katabi | G01S 5/04 345/173 |
| 2015/0346820 A1* | 12/2015 | Poupyrev | G01S 13/88 345/156 |

(Continued)

FOREIGN PATENT DOCUMENTS

| | | |
|---|---|---|
| JP | 2003-316510 A | 11/2003 |
| JP | 2016-153250 A | 8/2016 |

(Continued)

OTHER PUBLICATIONS

International Search Report and Written Opinion dated Jun. 26, 2018 in International (PCT) Application No. PCT/JP2018/015906; with English translation.

*Primary Examiner* — Richard J Hong
(74) *Attorney, Agent, or Firm* — McDermott Will & Emery LLP

(57) ABSTRACT

Each of radio wave sensors is associated with one of sensing areas, each being an area for sending a radio wave signal toward a moving body and receiving the radio wave signal reflected by the moving body. A gesture recognition method includes identifying, as a gesture occurrence area in which the moving body has made a gesture, one of the radio wave sensors based on results of reception by the sensing areas; and recognizing the gesture based on a result of reception by only one of the radio wave sensors associated with the gesture occurrence area.

22 Claims, 13 Drawing Sheets

(56) References Cited

U.S. PATENT DOCUMENTS

| | | | |
|---|---|---|---|
| 2016/0055201 A1 | 2/2016 | Poupyrev et al. | |
| 2016/0320852 A1 | 11/2016 | Poupyrev | |
| 2016/0320853 A1 | 11/2016 | Lien et al. | |
| 2017/0095125 A1 | 4/2017 | Tsuiki et al. | |
| 2018/0059798 A1 | 3/2018 | Matsubara et al. | |
| 2018/0120420 A1* | 5/2018 | McMahon | A61B 5/1123 |
| 2018/0238099 A1* | 8/2018 | Schatz | E05F 15/622 |
| 2019/0086971 A1* | 3/2019 | Sanders | G06F 1/1694 |
| 2020/0205726 A1* | 7/2020 | Lee | A61B 5/6887 |

FOREIGN PATENT DOCUMENTS

| | | |
|---|---|---|
| JP | 2017-067697 A | 4/2017 |
| JP | 2017-199278 A | 11/2017 |

* cited by examiner

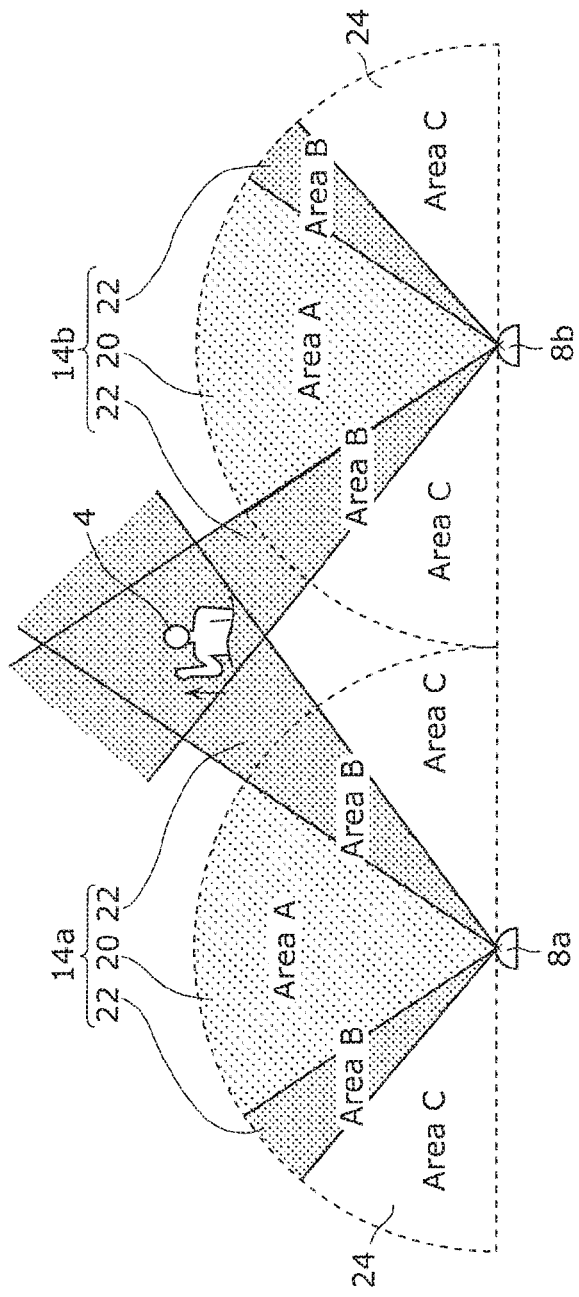

GESTURE RECOGNITION METHOD AND GESTURE RECOGNITION DEVICE HAVING A PLURALITY OF RADIO WAVE SENSORS ASSOCIATED WITH A GESTURE OCCURRENCE AREA

CROSS REFERENCE TO RELATED APPLICATION

This is a continuation application of PCT Patent Application No. PCT/JP2018/015906 filed on Apr. 17, 2018, designating the United States of America. The entire disclosure of the above-identified application, including the specification, drawings and claims is incorporated herein by reference in its entirety.

FIELD

The present disclosure relates to a gesture recognition method and a gesture recognition device for recognizing gestures.

BACKGROUND

Gesture recognition devices for recognizing gestures utilizing radio wave signals are known (see, e.g., Patent Literature (PTL) 1). This type of gesture recognition device includes a radio wave sensor and a recognizer. The radio wave sensor sends radio wave signals toward a moving body and receives the radio wave signals reflected by the moving body. The recognizer recognizes the gestures based on the radio wave signals received by the radio wave sensor.

CITATION LIST

Patent Literature

PTL 1: U.S. Pat. No. 9,575,560

SUMMARY

Technical Problem

However, the conventional gesture recognition devices described above recognize only gestures in a position determined in advance.

It is an objective of the present disclosure to provide a gesture recognition method and a gesture recognition device capable of recognizing gestures made in any position.

Solution to Problem

A gesture recognition method according to one aspect of the present disclosure is for recognizing a gesture of a moving body, using a plurality of radio wave sensors each associated with a different one of a plurality of sensing areas each being an area for sending a radio wave signal toward the moving body and receiving the radio wave signal reflected by the moving body. The gesture recognition method includes: (a) identifying, as a gesture occurrence area in which the moving body has made a gesture, one of the plurality of sensing areas based on results of reception by the plurality of radio wave sensors; and (b) recognizing the gesture based on a result of reception by only one of the plurality of radio wave sensors associated with the gesture occurrence area.

Note that such a general or specific aspect may be implemented using a system, a method, an integrated circuit, a computer program, or a storage medium such as a computer-readable CD-ROM or any combination of systems, methods, integrated circuits, computer programs, and storage media.

Advantageous Effects

The gesture recognition method, for example, according to the aspect of the present disclosure recognizes gestures made in any position.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 7C shows an example gesture made in two overlapping second areas.

DESCRIPTION OF EMBODIMENTS

Figure 1:
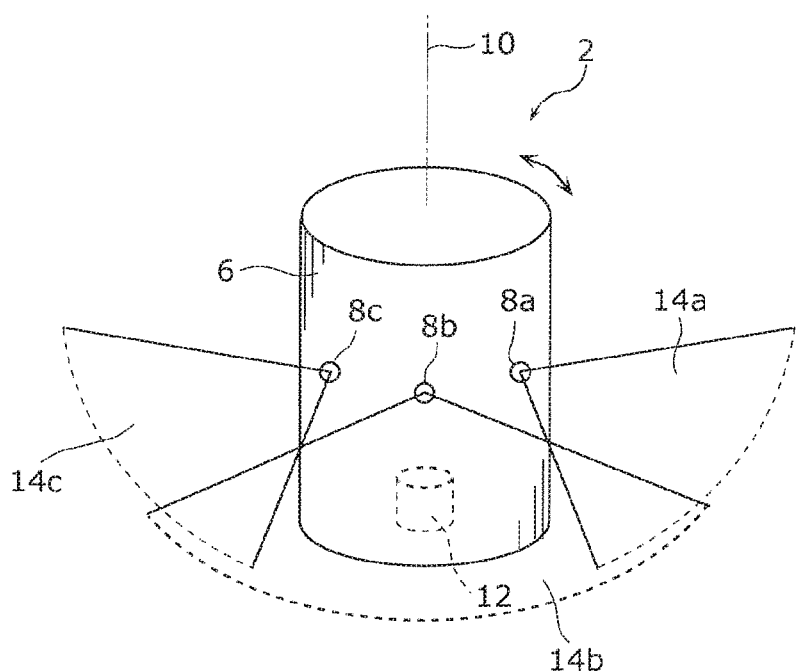
FIG. 1 is a perspective view showing an appearance of a gesture recognition device according to Embodiment 1.

A gesture recognition method according to one aspect of the present disclosure is for recognizing a gesture of a moving body, using a plurality of radio wave sensors each associated with a different one of a plurality of sensing areas each being an area for sending a radio wave signal toward the moving body and receiving the radio wave signal reflected by the moving body. The gesture recognition method includes: (a) identifying, as a gesture occurrence area in which the moving body has made a gesture, one of the plurality of sensing areas based on results of reception by the plurality of radio wave sensors; and (b) recognizing the gesture based on a result of reception by only one of the plurality of radio wave sensors associated with the gesture occurrence area.

According to this aspect, one of the plurality of sensing areas is identified as the gesture occurrence area based on the results of reception by the plurality of radio wave sensors. Accordingly, a gesture can be recognized which has been made in any position of the plurality of sensing areas.

For example, each of the plurality of sensing areas may include: a first area spreading from an optical axis of one of the radio wave sensors associated with the sensing area; and a second area spreading from the optical axis beyond the first area. In (a), one sensing area may be identified as the gesture occurrence area, from any one of the first area and the second area included in the one of the plurality of sensing areas based on the results of reception by the plurality of radio wave sensors.

According to this aspect, any one of the first area and the second area included in one of the plurality of sensing areas is identified as the gesture occurrence area based on the results of reception by the plurality of radio wave sensors. Accordingly, the gesture can be recognized more accurately.

For example, in (a), at occurrence of the gesture in an overlap between the first areas of two adjacent sensing areas, any one of the first areas of the two adjacent sensing areas may be identified as the gesture occurrence area.

According to this aspect, the gesture is recognized based on the result of reception by only one radio wave sensor associated with any one of the two sensing areas. Accordingly, the gesture can be recognized more accurately.

For example, in (a), at occurrence of the gesture in an overlap between the first area of one of two adjacent sensing areas and the second area of the other of the two adjacent sensing areas, the first area may be identified as the gesture occurrence area.

According to this aspect, the gesture is recognized based on the result of reception by only one radio wave sensor associated with the sensing area including the first area. Accordingly, the gesture can be recognized more accurately.

For example, in (b), the gesture may be recognized using a recognition engine subjected to machine learning in advance by inputting, to each of the plurality of radio wave sensors, a radio wave signal indicating a gesture in each of the first area and the second area included in one of the plurality of sensing areas associated with the radio wave sensor.

According to this aspect, the gesture is recognized using the recognition engine subjected to the machine learning. Accordingly, the gesture is recognized more easily than, for example, in the case of recognizing a gesture by analyzing a radio wave signal received by a radio wave sensor.

For example, the plurality of radio wave sensors may be arranged on a side surface of a case rotatable about a rotation axis, in a rotation direction of the case. The gesture recognition method may further includes rotating the case to cause the first area included in the one of the plurality of sensing areas to overlap the gesture occurrence area, upon identification of the second area included in the one of the plurality of sensing areas as the gesture occurrence area in (a).

According to this aspect, the gesture is more accurately recognized in the first area than in the second area. Accordingly, the gesture can be recognized more accurately by rotating the case so that the first area overlaps the gesture occurrence area.

A gesture recognition method according to another aspect of the present disclosure is for recognizing a gesture of a moving body, using a plurality of radio wave sensors, each associated with a different one of a plurality of sensing areas, each being an area for sending a radio wave signal toward the moving body and receiving the radio wave signal reflected by the moving body. The gesture recognition method includes: (a) identifying, as gesture occurrence areas in each of which the moving body has made a gesture, at least two of the plurality of sensing areas based on results of reception by the plurality of radio wave sensors; and (b) recognizing the gesture based on results of reception by at least two of the plurality of radio wave sensors associated with the gesture occurrence areas.

According to this aspect, at least two of the plurality of sensing areas are identified as the gesture occurrence areas based on the results of reception by the plurality of radio wave sensors. Accordingly, a gesture can be recognized which has been made in any position of the plurality of sensing areas.

For example, each of the plurality of sensing areas may include: a first area spreading from an optical axis of one of the radio wave sensors associated with the sensing area; and a second area spreading from the optical axis beyond the first area. In (a), any one of the first areas and the second areas included in the at least two of the plurality of sensing areas may be identified as the gesture occurrence areas based on the results of reception by the plurality of radio wave sensors.

For example, in (b), the gesture may be recognized using a recognition engine subjected to machine learning in advance by inputting, to each of the plurality of radio wave sensors, a radio wave signal indicating a gesture in each of the first area and the second area included in one of the plurality of sensing areas associated with the radio wave sensor.

A gesture recognition device according to one aspect of the present disclosure is for recognizing a gesture. The gesture recognition device includes: a plurality of radio wave sensors for sending and receiving radio wave signals, each of the plurality of radio wave sensors being associated with a different one of a plurality of sensing areas, each being an area for sending a radio wave signal toward a moving body and receiving the radio wave signal reflected by the moving body; a controller that identifies, as a gesture occurrence area in which the moving body made the gesture of, one of the plurality of sensing areas based on results of reception by the plurality of radio wave sensors; and a recognition engine that recognizes the gesture based on a result of reception by only one of the plurality of radio wave sensors associated with the gesture occurrence area.

According to this aspect, one of the plurality of sensing areas is identified as the gesture occurrence area based on the results of reception by the plurality of radio wave sensors. Accordingly, a gesture can be recognized which has been made in any position of the plurality of sensing areas.

For example, each of the plurality of sensing areas may include: a first area spreading from an optical axis of one of the radio wave sensors associated with the sensing area; and a second area spreading from the optical axis beyond the first area. The controller may identify, as the gesture occurrence area, one sensing area from any one of the first area and the second area included in the one of the plurality of sensing areas based on the results of reception by the plurality of radio wave sensors.

For example, at occurrence of the gesture in an overlap between the first areas of two adjacent sensing areas, the controller may identify any one of the first areas of the two adjacent sensing areas as the gesture occurrence area.

For example, at occurrence of the gesture in an overlap between the first area of one of two adjacent sensing areas and the second area of the other of the two adjacent sensing areas, the controller may identify the first area as the gesture occurrence area.

For example, the recognition engine may recognize the gesture based on a result of training through machine learning performed in advance by inputting, to each of the plurality of radio wave sensors, a radio wave signal indicating a gesture in each of the first area and the second area included in one of the plurality of sensing areas associated with the radio wave sensor.

For example, the gesture recognition device may further include: a case rotatable about a rotation axis; and a drive source for rotating the case. The plurality of radio wave sensors arranged on a side surface of the case in a rotation direction of the case. Upon identification of the second area included in the one of the plurality of sensing areas as the gesture occurrence area, the controller causes the drive source to rotate the case to cause the first area included in the one of the plurality of sensing areas to overlap the gesture occurrence area.

A gesture recognition device for recognizing a gesture according to another aspect of the present disclosure includes: a plurality of radio wave sensors for sending and receiving radio wave signals, each of the plurality of radio wave sensors being associated with a different one of a plurality of sensing areas, each being an area for sending a radio wave signal toward a moving body and receiving the radio wave signal reflected by the moving body; a controller that identifies, as gesture occurrence areas in each of which the moving body has made a gesture, at least two of the plurality of sensing areas based on results of reception by the plurality of radio wave sensors; and a recognition engine that recognizes the gesture based on results of reception by at least two of the plurality of radio wave sensors associated with the gesture occurrence areas.

According to this aspect, at least two of the plurality of sensing areas are identified as the gesture occurrence areas based on the results of reception by the plurality of radio wave sensors. Accordingly, a gesture can be recognized which has been made in any position of the plurality of sensing areas.

For example, each of the plurality of sensing areas may include: a first area spreading from an optical axis of one of the radio wave sensors associated with the sensing area; and a second area spreading from the optical axis beyond the first area. The controller may identify, as the gesture occurrence areas, any one of the first areas and the second areas included in the at least two of the plurality of sensing areas based on the results of reception by the plurality of radio wave sensors.

For example, the recognition engine may recognize the gesture based on a result of training through machine learning performed in advance by inputting, to each of the plurality of radio wave sensors, a radio wave signal indicating a gesture in each of the first area and the second area included in one of the plurality of sensing areas associated with the radio wave sensor.

Now, embodiments will be described in detail with reference to the drawings.

Note that the embodiments described below are mere general or specific examples. The numerical values, shapes, materials, constituent elements, the arrangement and connection of the constituent elements, steps, step orders etc. shown in the following embodiments are thus mere examples, and are not intended to limit the claims. Among the constituent elements in the following embodiments, those not recited in any of the independent claims defining the broadest concept are described as optional constituent elements.

The figures are not necessarily drawn strictly to scale. In the figures, substantially the same constituent elements are assigned with the same reference marks, and redundant descriptions will be omitted or simplified.

Embodiment 1

[1-1. Structure of Gesture Recognition Device]

Figure 2:
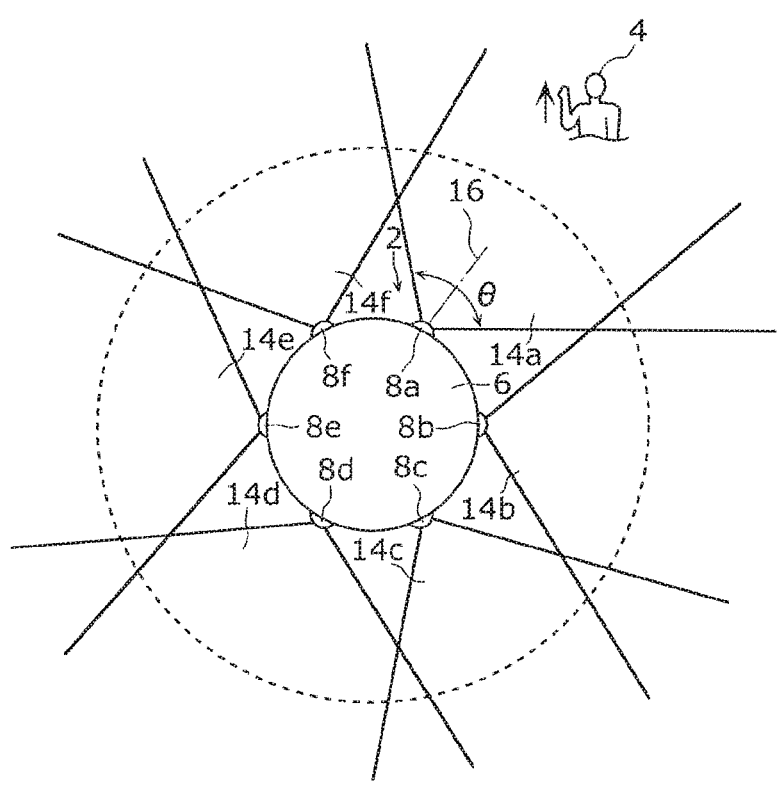
FIG. 2 is a plan view of the gesture recognition device according to Embodiment 1.
Figure 3:
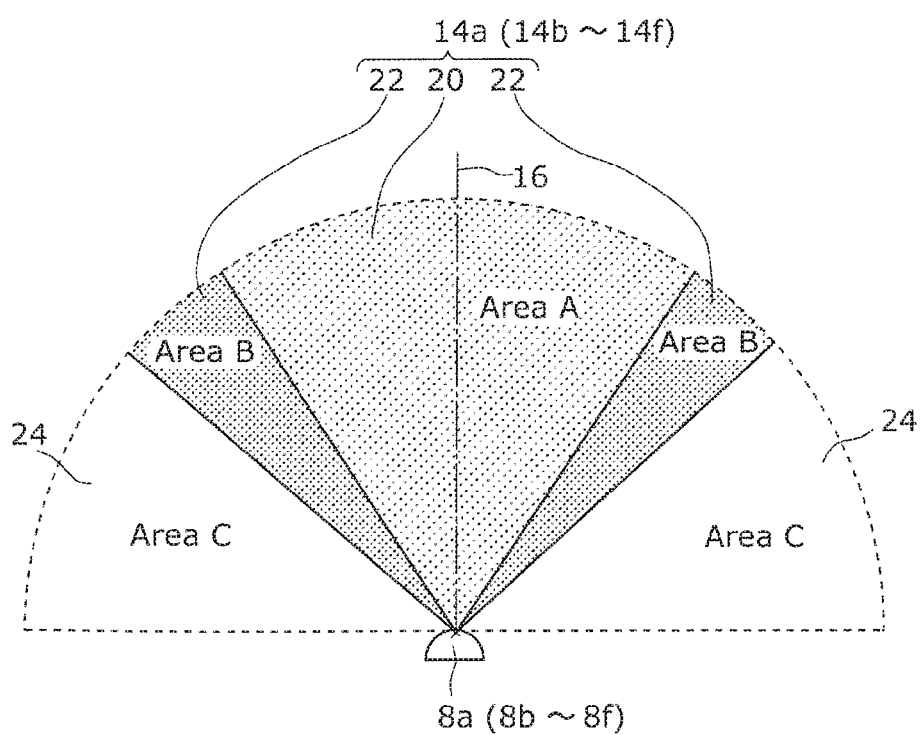
FIG. 3 is an enlarged view of a sensing area according to Embodiment 1.

First, a structure of gesture recognition device 2 according to Embodiment 1 will be described with reference to FIGS. 1 to 3. FIG. 1 is a perspective view showing an appearance of gesture recognition device 2 according to Embodiment 1. FIG. 2 is a plan view of gesture recognition device 2 according to Embodiment 1. FIG. 3 is an enlarged view of sensing area 14a (and each of 14b to 14f) according to Embodiment 1.

As shown in FIG. 1, gesture recognition device 2 is a user interface for recognizing gestures of instructor 4 (i.e., an example of a moving body), mounted in an artificial intelligence (AI) speaker, for example. As shown in FIG. 2, instructor 4 is present in any of the plurality of sensing areas 14a to 14f, which will be described later, and makes a gesture to instruct an operation of the AI speaker corresponding to the gesture. For example, instructor 4 makes the gesture of swinging up the right arm, thereby turning up the volume of the AI speaker. On the other hand, instructor 4 makes the gesture of swinging down the right arm, thereby turning down the volume of the AI speaker.

As shown in FIG. 1, gesture recognition device 2 includes case 6 and a plurality of radio wave sensors 8a, 8b, 8c, 8d, 8e, and 8f (i.e., 8a to 8f).

As shown in FIG. 1, case 6 is in the shape of a hollow cylinder. Case 6 is rotatable about rotation axis 10 extending axially. Located inside case 6 is motor 12 (i.e., an example of a drive source) for rotating case 6. Although not shown, for example, a speaker, a microphone, and a circuit board are located inside case 6 in addition to motor 12.

As shown in FIGS. 1 and. 2, the plurality of radio wave sensors 8a to 8f are arranged at an equal interval on the side surface of case 6 along the circumference (i.e., in the rotation direction) of case 6. Each of the plurality of radio wave sensors 8a to 8f sends radio wave signals toward a moving body (e.g., instructor 4) and receives the radio wave signals reflected by the moving body. The radio wave signals are millimeter radar waves within a frequency band around 60 GHz, for example. With respect to the operation timing of the plurality of radio wave sensors 8a to 8f, the plurality of radio wave sensors 8a to 8f may operate at the same time or in time sharing to reduce the interference between the radio wave sensors.

As shown in FIG. 2, the plurality of radio wave sensors 8a, 8b, 8c, 8d, 8e, and 8f are associated with a plurality of sensing areas 14a, 14b, 14c, 14d, 14e, and 14f (i.e., 14a to 14f), respectively, each being an area for sending/receiving the radio wave signals. Sensing area 14a (and each of 14b to 14f) spreads in a substantially conical shape about optical axis 16 of radio wave sensor 8a (and each of 8b to 8f) associated with sensing area 14a (and each of 14b to 14f) at a predetermined angle θ (e.g., about 100°). As shown in FIG. 2, parts of adjacent pairs of the plurality of sensing areas 14a to 14f overlap each other in a plan view.

In the area outside the circle indicated by the broken line in FIG. 2, the moving body is present in any of the plurality of sensing areas 14a to 14f. In this case, any of the plurality of radio wave sensors 8a to 8f receives the radio wave signals reflected by the moving body.

As shown in FIG. 3, each of the plurality of sensing areas 14a to 14f includes first area 20 (hereinafter also referred to as "area A") and second area 22 (hereinafter also referred to as "area B"). First area 20 spreads from optical axis 16 of radio wave sensor 8a (and each of 8b to 8f) associated with sensing area 14a (and each of 14b to 14f). Second area 22 spreads from optical axis 16 beyond first area 20. That is, second area 22 extends to the outside of first area 20. Note that the area of sensing area 14a (and each of 14b to 14f) outside second area 22 is non-sensing area 24 (hereinafter also referred to as "area C") in which radio wave sensor 8a (and each of 8b to 8f) sends and receives no radio wave signals.

Assume that a radio wave signal reflected by the moving body passes through first area 20 of sensing area 14a, for example. Radio wave sensor 8a receives then the radio wave signal and recognition engine 28, which will be described later, recognizes a gesture highly accurately. On the other hand, assume that a radio wave signal reflected by the moving body passes through second area 22 of sensing area 14a, for example. Radio wave sensor 8a receives then the radio wave signal but recognition engine 28 recognizes a gesture at a lower accuracy than in the case of first area 20.

[1-2. Functional Configuration of Gesture Recognition Device]

Figure 4:
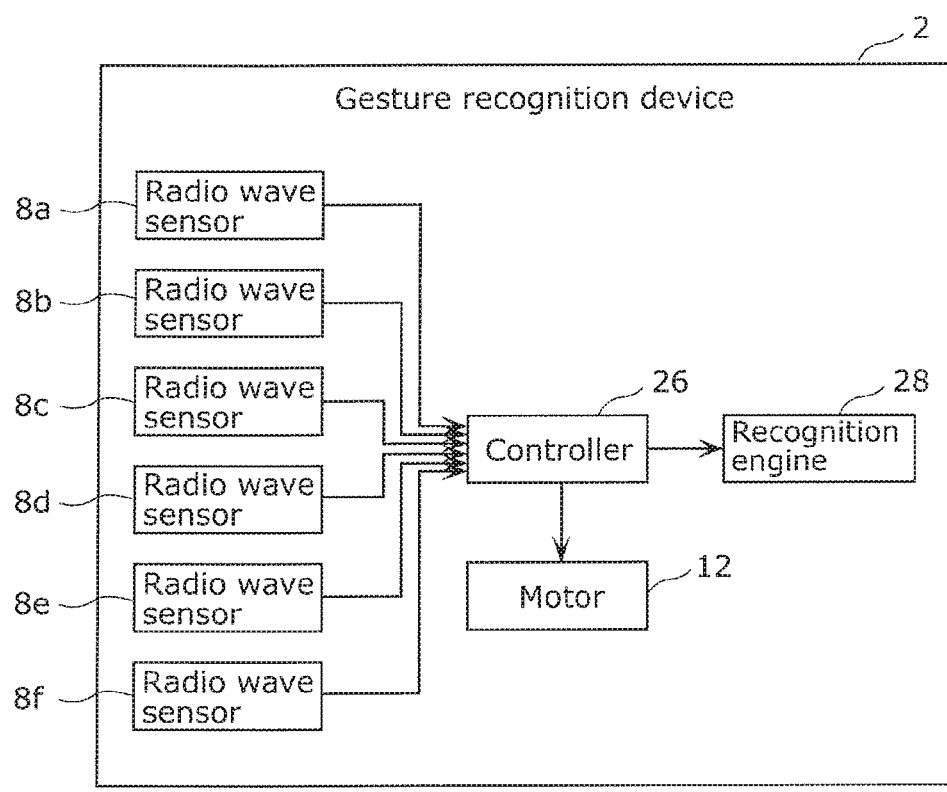
FIG. 4 is a block diagram showing a functional configuration of the gesture recognition device according to Embodiment 1.
Figure 5:
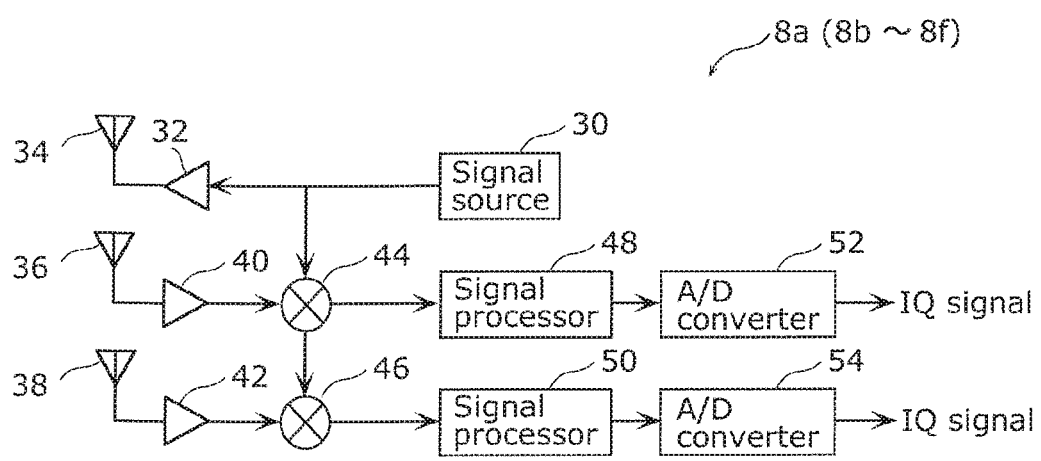
FIG. 5 is a block diagram showing a functional configuration of a radio wave sensor according to Embodiment 1.
Figure 6:
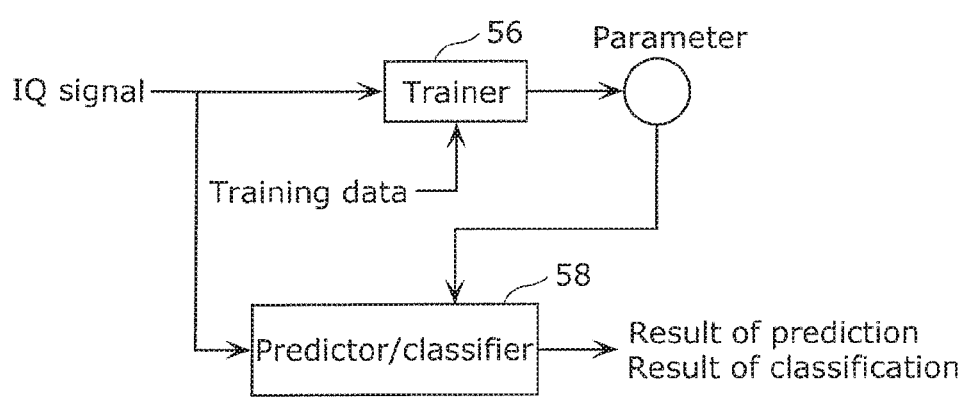
FIG. 6 is a block diagram showing a concept of machine learning of gestures.
Figure 7A:
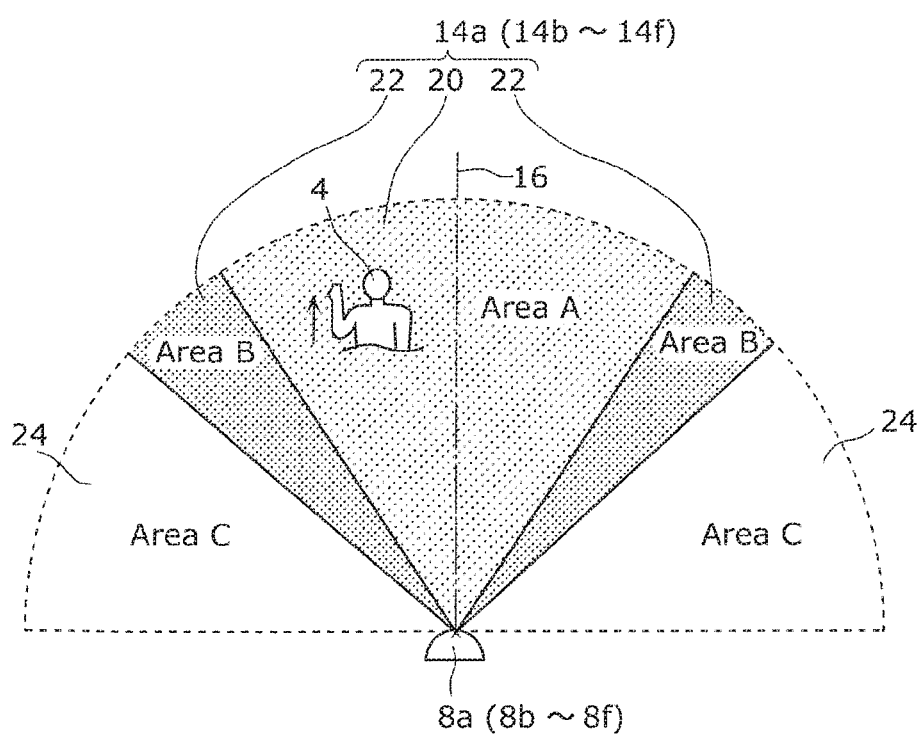
FIG. 7A shows an example gesture made in a first area.
Figure 7B:
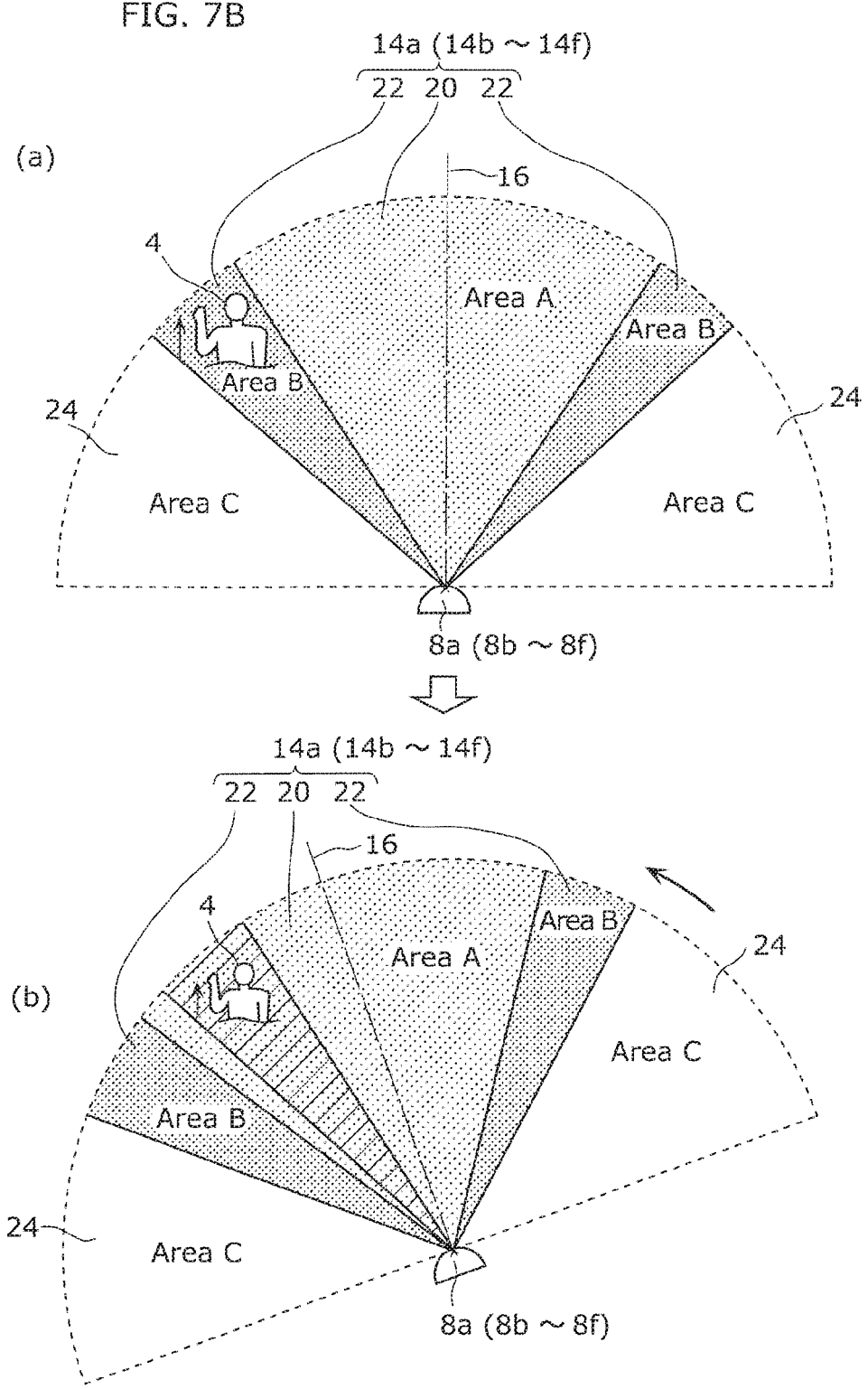
FIG. 7B shows an example gesture made in a second area.

Now, a functional configuration of gesture recognition device 2 according to Embodiment 1 will be described with reference to FIGS. 4 to 7C. FIG. 4 is a block diagram showing the functional configuration of gesture recognition device 2 according to Embodiment 1. FIG. 5 is a block diagram showing a functional configuration of radio wave sensor 8a (and each of 8b to 8f) according to Embodiment 1. FIG. 6 is a block diagram showing a concept of machine learning of gestures. FIG. 7A shows an example gesture made in first area 20. FIG. 7B shows an example gesture made in second area 22. FIG. 7C shows an example gesture made in two overlapping second areas 22.

As shown in FIG. 4, gesture recognition device 2 includes, as a functional configuration, the plurality of radio wave sensors 8a to 8f, controller 26, and recognition engine 28.

As shown in FIG. 5, each of the plurality of radio wave sensors 8a to 8f includes signal source 30, amplifier 32, transmitting antenna 34, receiving antennas 36 and 38, amplifiers 40 and 42, multipliers 44 and 46, signal processors 48 and 50, and A/D converters 52 and 54.

Signal source 30 generates radio wave signals. Amplifier 32 amplifies the radio wave signals from signal source 30. Transmitting antenna 34 sends the radio wave signals from amplifier 32 toward a moving body.

Receiving antennas 36 and 38 receive the radio wave signals reflected by the moving body. Amplifiers 40 and 42 amplify the radio wave signals from receiving antennas 36 and 38, respectively. Multiplier 44 calculates analysis information such as the difference in frequency or phase, for example, between a radio wave signal from signal source 30 and a radio wave signal from amplifier 40. Multiplier 46 calculates analysis information such as the difference in frequency or phase, for example, between a radio wave signal from signal source 30 and a radio wave signal from amplifier 42. Signal processors 48 and 50 perform predetermined processing of radio wave signals from multipliers 44 and 46, respectively. A/D converters 52 and 54 convert radio wave signals from signal processors 48 and 50, respectively, from analog to digital. Radio wave signals from A/D converters 52 and 54 are output as what are called "IQ signals" (namely, I and Q signals) to controller 26.

Controller 26 identifies one or more of the plurality of sensing areas 14a to 14f as the gesture occurrence area(s), in which a moving body has made a gesture, based on results of reception by the plurality of radio wave sensors 8a to 8f. For example, when instructor 4 is present in first area 20 of sensing area 14a and makes gesture, controller 26 identifies first area 20 of sensing area 14a as the gesture occurrence area based on a result of reception by radio wave sensor 8a. At this time, controller 26 determines in which of first area 20 and second area 22 of sensing area 14a the moving body has made a gesture based on the incident angle of a radio wave signal reflected by the moving body into radio wave sensor 8a.

If being placed indoors, for example, gesture recognition device 2 may be configured, for example, as follows, not to cause a moving body present outdoors to be recognized by the plurality of radio wave sensors 8a to 8f. Specifically, controller 26 measures the distance between gesture recognition device 2 and the moving body based on the respective radio wave signals received by the plurality of radio wave sensors 8a to 8f. If the measured distance exceeds a threshold, the controller excludes the moving body from the recognition target.

In addition, controller 26 controls driving of motor 12 based on the identified gesture occurrence area. Specifically, as shown in (a) of FIG. 7B, controller 26 drives motor 12, for example, upon identification of second area 22 of sensing area 14a as the gesture occurrence area. This is to rotate case 6 so that first area 20 of sensing area 14a overlaps the gesture occurrence area as shown in (b) of FIG. 7B. Note that the gesture occurrence area (i.e., the area corresponding to second area 22 before the rotation of case 6) is hatched in (b) of FIG. 7B.

If there are a plurality of people around gesture recognition device 2, controller 26 may first identify, as instructor 4, one of the people who has made a big gesture (e.g., a gesture of drawing a large circle with the right arm). In this case, gesture recognition device 2 may turn on a light emitter (not shown) located in case 6 to notify instructor 4 of the fact that instructor 4 has been identified. After that, this instructor 4 makes another gesture in the position to instruct an operation of the AI speaker.

Recognition engine 28 recognizes the gesture of instructor 4 based on a result of reception(s) by one or more of the plurality of radio wave sensors 8a to 8f associated with the gesture occurrence area(s). Specifically, recognition engine 28 inputs, to each of the plurality of radio wave sensors 8a to 8f, a radio wave signal indicating a gesture in each of first area 20 and second area 22 included in sensing area 14a (and each of 14b to 14f) associated with radio wave sensor 8a (and each of 8b to 8f). The recognition engine recognizes then the gesture based on a result of training through machine learning performed in advance.

The recognition result obtained by recognition engine 28 is converted into an operation command of gesture recognition device 2 itself and used as an operation instruction of gesture recognition device 2. Alternatively, the result of recognition obtained by recognition engine 28 is converted into an operation command of equipment connected wired or wireless to gesture recognition device 2 and used as an operation instruction of the equipment.

The machine learning in recognition engine 28 is performed, for example, as follows in manufacture of gesture recognition device 2. As shown in FIG. 6, radio wave signals (i.e., IQ signals) indicating gestures in first area 20 or second area 22 are input to trainer 56. The radio wave signals input to trainer 56 are trained based on training data including criteria shown by human in advance to generate parameters for properly outputting radio wave signals. The generated parameters are accumulated as results of training in predictor/classifier 58. This predictor/classifier 58 is mounted in recognition engine 28. Recognition engine 28 recognizes gestures based on the parameters accumulated in predictor/classifier 58. Note that each radio wave signal may be at least one signal selected from a pair or pairs of I and Q signals. Specifically, the radio wave signal may be, for example, only one I signal or two pairs of I and Q signals.

The machine learning in recognition engine 28 is here performed in the following three patterns, for example. In the first pattern, as shown in FIG. 7A, instructor 4 is present in first area 20 of sensing area 14a (and each of 14b to 14f) and makes a gesture to input to trainer 56, a radio wave signal indicating the gesture made in first area 20, thereby performing machine learning. In the second pattern, as shown in (a) of FIG. 7B, instructor 4 is present in second area 22 of sensing area 14a (and each of 14b to 14f) and makes a gesture to input to trainer 56, a radio wave signal indicating the gesture made in second area 22, thereby performing machine learning. In the third pattern, as shown in FIG. 7C, instructor 4 is present in overlapping second areas 22 of two adjacent sensing areas 14a and 14b, for example, and makes a gesture to input trainer 56, a radio wave signal indicating the gesture made in two second areas 22, thereby performing machine learning.

Note that the instructor may be in overlapping first areas 20 of two adjacent sensing areas 14a and 14b, for example, and make a gesture to input to trainer 56, a radio wave signal indicating the gesture made in two first areas 20, thereby performing machine learning.

[1-3. Operation of Gesture Recognition Device]

Now, an operation of gesture recognition device 2 according to Embodiment 1 will be described. The operation of gesture recognition device 2 is divided into two cases, which will be described below. Single radio wave sensor 8a receives a radio wave signal in one case, whereas two radio wave sensors 8a and 8b receive radio wave signals in the other case.

[1-3-1. Operation where Single Radio Wave Sensor Receives Radio Wave Signal]

Figure 8:
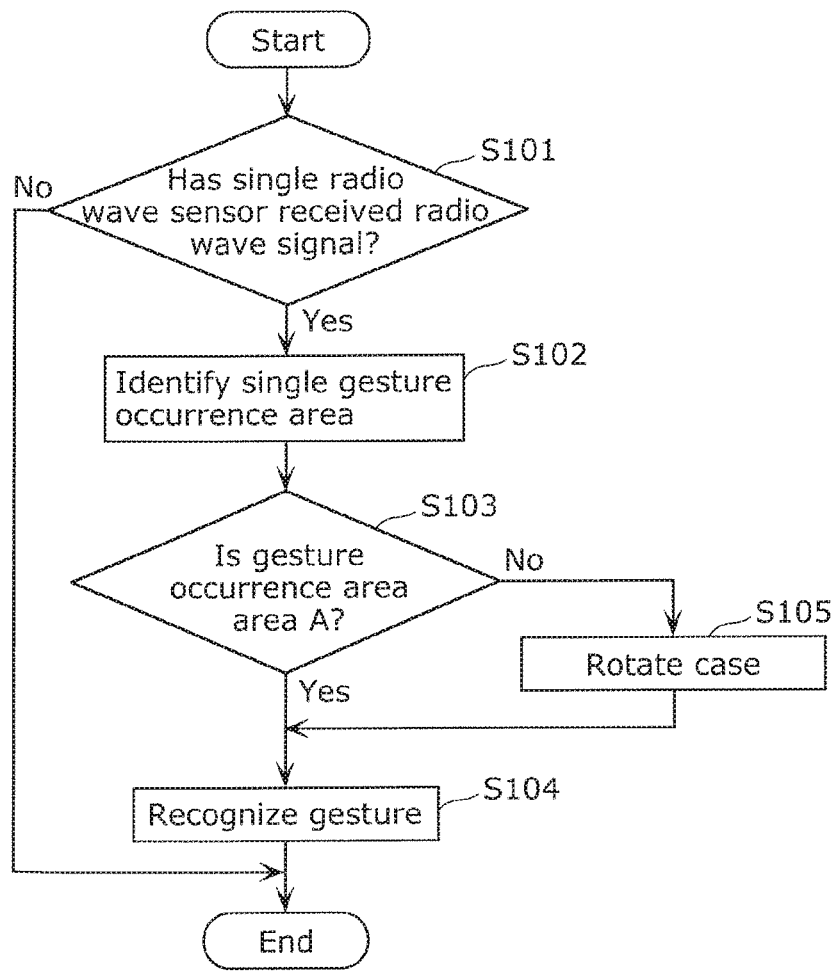
FIG. 8 is a flowchart showing a flow of an operation of the gesture recognition device according to Embodiment 1 where a single radio wave sensor receives a radio wave signal.

First, the operation of gesture recognition device 2 where one of (e.g., radio wave sensor 8a) of the plurality of radio wave sensors 8a to 8f receives a radio wave signal will be described with reference to FIGS. 7A, 7B, and FIG. 8. FIG. 8 is a flowchart showing a flow of the operation of gesture recognition device 2 according to Embodiment 1 where single radio wave sensor 8a receives the radio wave signal.

As shown in FIG. 8, for example, if single radio wave sensor 8a receives the radio wave signal (YES in S101), controller 26 identifies a single gesture occurrence area based on a result of reception by single radio wave sensor 8a (S102). Note that single radio wave sensor 8a receives no radio wave signal, that is, none of the plurality of radio wave sensors 8a to 8f receives the radio wave signal (NO in S101), controller 26 ends the processing.

As shown in FIG. 7A, assume that instructor 4 is present in first area 20 (i.e., area A) of sensing area 14a and makes a gesture. The identified gesture occurrence area is then first area 20 of sensing area 14a (YES in S103). In this case, recognition engine 28 recognizes the gesture of instructor 4 based on a result of reception only by single radio wave sensor 8a associated with the gesture occurrence area (S104).

Returning to step S103, as shown in (a) of FIG. 7B, assume that instructor 4 is present in second area 22 (i.e., area B) of sensing area 14a and makes a gesture. The identified gesture occurrence area is then second area 22 of sensing area 14a (NO in S103). In this case, controller 26 drives motor 12 to rotate case 6 (S105). Accordingly, first area 20 of sensing area 14a overlaps the gesture occurrence area, as shown in (b) of FIG. 7B. Recognition engine 28 recognizes the gesture of instructor 4 based on a result of reception only by single radio wave sensor 8a associated with the gesture occurrence area (S104). Since radio wave sensor 8a receives the radio wave signal in first area 20 of sensing area 14a, recognition engine 28 recognizes the gesture of instructor 4 at a higher accurate.

In this embodiment, controller 26 rotates case 6 in step S105. The configuration is however not limited thereto. The controller may not rotate case 6. In this case, recognition engine 28 recognizes the gesture of instructor 4 based on a result of receiving the radio wave signal by radio wave sensor 8a in second area 22. This allows recognition engine 28 to recognize the gesture of instructor 4, although at a lower accuracy than in the case of rotating case 6 as described above.

[1-3-2. Operation where Two Radio Wave Sensors Receive Radio Wave Signal]

Figure 9:
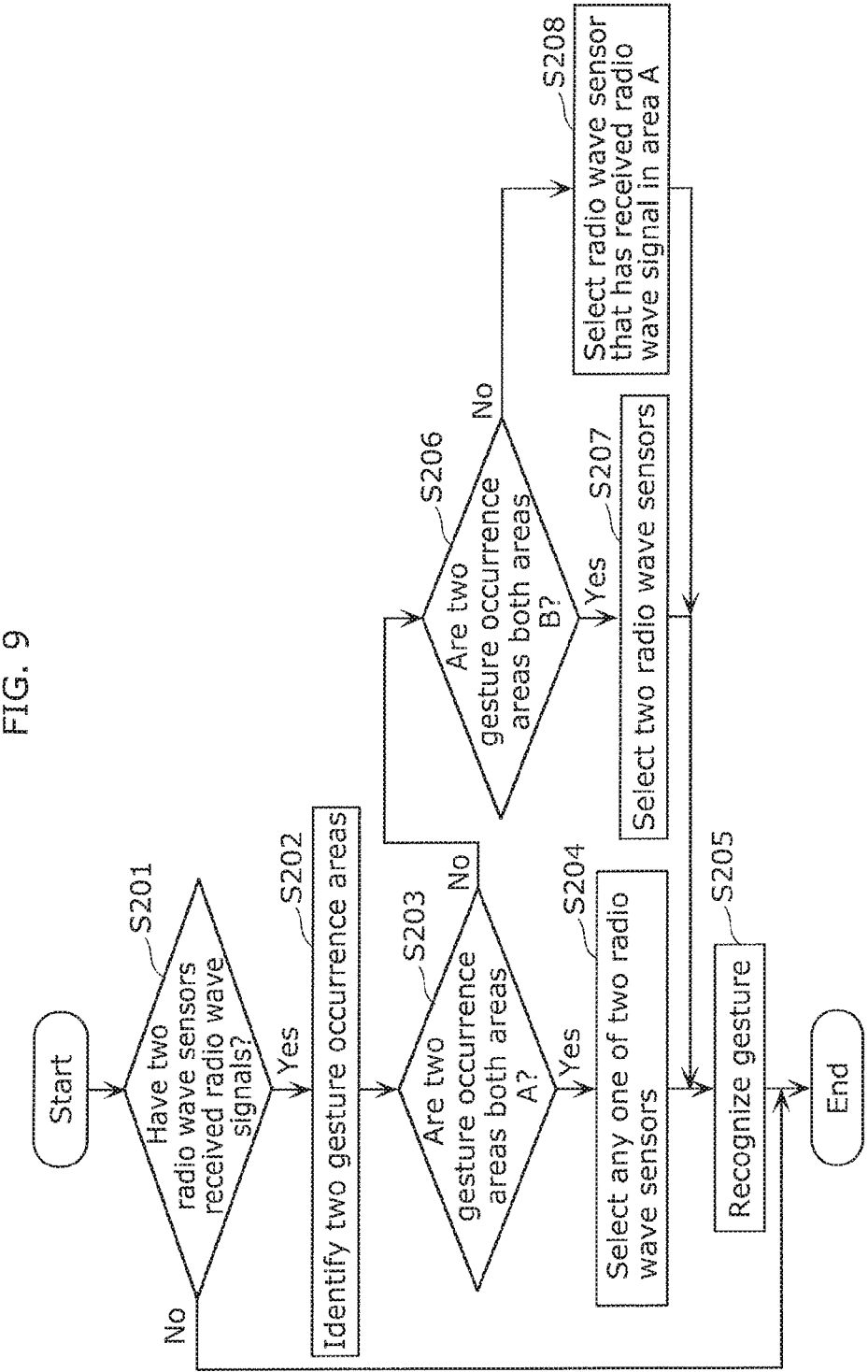
FIG. 9 is a flowchart showing a flow of an operation of the gesture recognition device according to Embodiment 1 where two radio wave sensors receive radio wave signals.

Now, the operation of gesture recognition device 2 where two (e.g., radio wave sensors 8a and 8b) of the plurality of radio wave sensors 8a to 8f receive radio wave signals will be described with reference to FIGS. 7C and 9. FIG. 9 is a flowchart showing a flow of the operation of gesture recognition device 2 according to Embodiment 1 where two radio wave sensors 8a and 8b receive the radio wave signals.

As shown in FIG. 9, for example, assume that two radio wave sensors 8a and 8b receive the radio wave signals (YES in S201). Controller 26 identifies two gesture occurrence areas based on results of reception by two radio wave sensors 8a and 8b (S202). If none of two radio wave sensors 8a and 8b receives the radio wave signal (NO in S201), controller 26 ends the processing. On the other hand, if any one of two radio wave sensors 8a and 8b receives the radio wave signal (NO in S201), the processing of the flowchart shown in FIG. 8 is executed.

Assume that instructor 4 is present in the overlap between first area 20 (i.e., area A) of sensing area 14a and first area 20 (i.e., area A) of sensing area 14b and makes a gesture. The two identified gesture occurrence areas are then first area 20 of sensing area 14a and first area 20 of sensing area 14b (YES in S203). In this case, controller 26 selects any one of two radio wave sensors 8a and 8b (S204). That is, controller 26 identifies, as the gesture occurrence area, any one of first area 20 of sensing area 14a and first area 20 of sensing area 14b. At this time, controller 26 may select a predetermined one of two radio wave sensors 8a and 8b or may select one of the radio wave sensors whose optical axis 16 is closer to the position of instructor 4. Recognition engine 28 recognizes the gesture of instructor 4 based on a result of reception only by selected one radio wave sensor 8a (S205).

In this embodiment, controller 26 selects any one of two radio wave sensors 8a and 8b in step S204. The configuration is however not limited thereto. The controller may select both of two radio wave sensors 8a and 8b. In this case, recognition engine 28 recognizes the gesture of instructor 4 based on results of reception by selected two radio wave sensors 8a and 8b.

Returning to step S203, as shown in FIG. 7C, assume that instructor 4 is present in the overlap between second area 22 (i.e., area B) of sensing area 14*a* and second area 22 (i.e., area B) of sensing area 14*b* and makes a gesture. The two identified gesture occurrence areas are then second area 22 of sensing area 14*a* and second area 22 of sensing area 14*b* (NO in S203 and YES in S206). In this case, controller 26 selects both of two radio wave sensors 8*a* and 8*b* (S207). Recognition engine 28 recognizes the gesture of instructor 4 based on results of reception by selected two radio wave sensors 8*a* and 8*b* (S205).

In this embodiment controller 26 selects both of two radio wave sensors 8*a* and 8*b* in step S207. The configuration is however not limited thereto. The controller may select any one of two radio wave sensors 8*a* and 8*b*. At this time, controller 26 may select a predetermined one of two radio wave sensors 8*a* and 8 or may select one of the radio wave sensors whose optical axis 16 is closer to the position of instructor 4.

Returning to step S203, assume that instructor 4 is present in the overlap between first area 20 (i.e., area A) of sensing area 14*a* and second area 22 (i.e., area B) of sensing area 14*b* and makes a gesture. The two identified gesture occurrence areas are then first area 20 of sensing area 14*a* and second area 22 of sensing area 14*b* (NO in S203 and NO in S206). In this case, controller 26 selects, out of two radio wave sensors 8*a* and 8*b*, radio wave sensor 8*a* that has received the radio wave signal in first area 20 (S208). That is, controller 26 identifies first area 20 of sensing area 14*a* as the gesture occurrence area, out of first area 20 of sensing area 14*a* and second area 22 of sensing area 14*b*. Recognition engine 28 recognizes the gesture of instructor 4 based on a result of reception by selected radio wave sensor 8*a* (S205).

[1-4. Advantages]

As shown in FIG. 2, the plurality of sensing areas 14*a* to 14*f* associated with the plurality of radio wave sensors 8*a* to 8*f*, respectively, cover the entire periphery of case 6 in a plan view. Controller 26 identifies, as the gesture occurrence area(s), one or more of the plurality of sensing areas 14*a* to 14*f* based on the results of reception by the plurality of radio wave sensors 8*a* to 8*f*. As a result, the gesture of instructor 4 made in any position of the plurality of sensing areas 14*a* to 14*f* can be recognized.

Embodiment 2

[2-1. Structure of Gesture Recognition Device]

Figure 10:
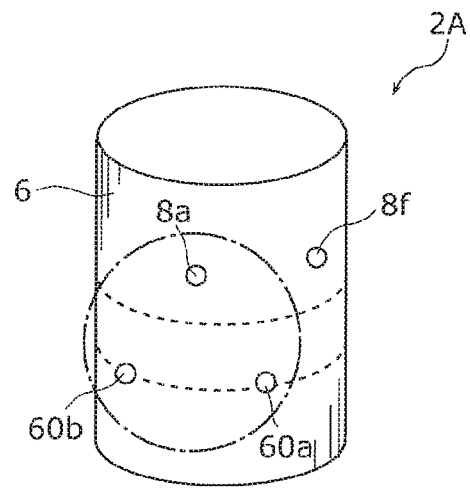
FIG. 10 is a perspective view showing an appearance of a gesture recognition device according to Embodiment 2.
Figure 11:
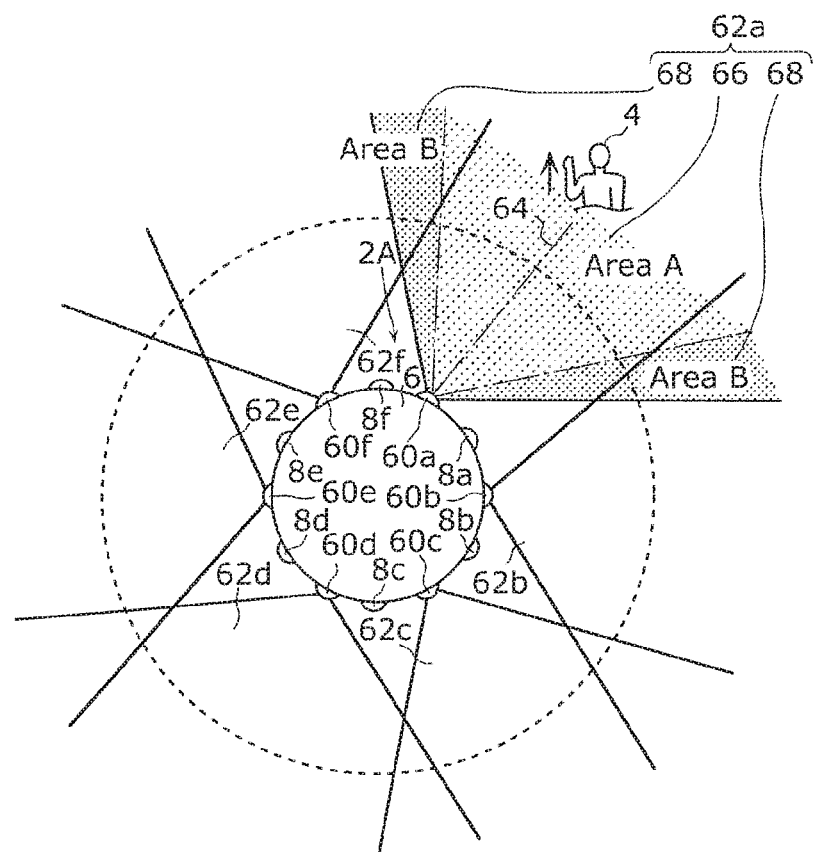
FIG. 11 is a plan view of the gesture recognition device according to Embodiment 2.

Now, a structure of gesture recognition device 2A according to Embodiment 2 will be described with reference to FIGS. 10 and 11. FIG. 10 is a perspective view showing an appearance of gesture recognition device 2A according to Embodiment 2. FIG. 11 is a plan view of gesture recognition device 2A according to Embodiment 2. In this embodiment, the same reference characters as those in Embodiment 1 described above are used to represent equivalent elements, and the detailed explanation thereof will be omitted.

As shown in FIGS. 10 and 11, gesture recognition device 2A according to Embodiment 2 includes a plurality of radio wave sensors 60*a*, 60*b*, 60*c*, 60*d*, 60*e*, and 60*f* (i.e., 60*a* to 60*f*) in addition to the plurality of radio wave sensors 8*a* to 8*f*. In this embodiment, case 6 neither rotates nor includes any motor inside.

As shown in FIGS. 10 and 11, the plurality of radio wave sensors 60*a* to 60*f* are arranged at an equal interval on the side surface of case 6 along the circumference of case 6. The plurality of radio wave sensors 60*a* to 60*f* are arranged below the plurality of radio wave sensors 8*a* to 8*f* and staggered with respect to the plurality of radio wave sensors 8*a* to 8*f*. At this time, each of the plurality of overlying radio wave sensors 8*a* to 8*f* may have an optical axis at an angle of elevation and face slightly upward with respect to the horizontal plane. On the other hand, each of the plurality of underlying radio wave sensors 60*a* to 60*f* may have an optical axis at an angle of depression and face slightly downward with respect to the horizontal plane. Like the plurality of radio wave sensors 8*a* to 8*f*, each of the plurality of radio wave sensors 60*a* to 60*f* sends radio wave signals toward a moving body and receives the radio wave signals reflected by the moving body. As shown in FIG. 11, the plurality of radio wave sensors 60*a*, 60*b*, 60*c*, 60*d*, 60*e*, and 60*f* are associated with the plurality of sensing areas 62*a*, 62*b*, 62*c*, 62*d*, 62*e*, and 62*f* (i.e., 62*a* to 62*f*), respectively, each being an area for sending/receiving radio wave signals.

As shown in FIG. 11, parts of two transversely adjacent sensing areas (e.g., sensing areas 62*a* and 62*b*) of the plurality of sensing areas 62*a* to 62*f* overlap each other. In addition, parts of three vertically adjacent sensing areas (e.g., sensing areas 14*a*, 60*a*, and 60*b*) of the plurality of sensing areas 14*a* to 14*f* (see FIG. 2) and the plurality of sensing areas 62*a* to 62*f* overlap each other.

As shown in FIG. 11, like the plurality of sensing areas 14*a* to 14*f*, each of the plurality of sensing areas 62*a* to 62*f* includes first area 66 (hereinafter also referred to as area A") and second area 68 (hereinafter also referred to as "area B"). First area 66 spreads from optical axis 64 of radio wave sensor 60*a* (and each of 60*b* to 60*f*) associated with sensing area 62*a* (and each of 62*b* to 62*f*). Second area 68 spreads from optical axis 64 beyond first area 66. For convenience of explanation, the plurality of sensing areas 14*a* to 14*f* associated with the plurality of radio wave sensors 8*a* to 8*f* are not shown in FIG. 11,

[2-2. Functional Configuration of Gesture Recognition Device]

Figure 12:
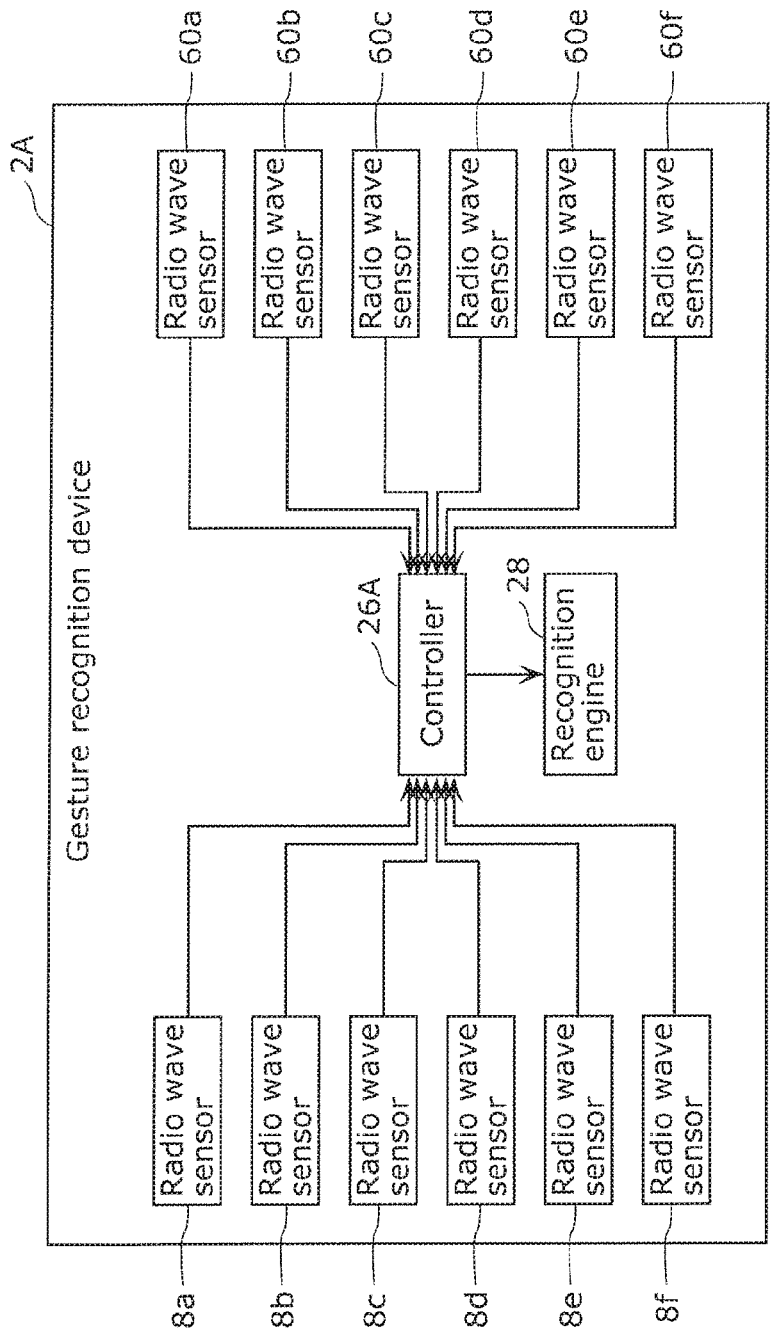
FIG. 12 is a block diagram showing a functional configuration of the gesture recognition device according to Embodiment 2.

Now, a functional configuration of gesture recognition device 2A according to Embodiment 2 will be described with reference to FIG. 12. FIG. 12 is a block diagram showing the functional configuration of gesture recognition device 2A according to Embodiment 2.

As shown in FIG. 12, gesture recognition device 2A includes, as a functional configuration, the plurality of radio wave sensors 8*a* to 8*f*, the plurality of radio wave sensors 60*a* to 60*f*, controller 26A, and recognition engine 28.

Controller 26A identifies, as the gesture occurrence area(s) in which the moving body has made a gesture, one or more of the plurality of sensing areas 14*a* to 14*f* and 62*a* to 62*f* based on results of reception by the plurality of radio wave sensors 8*a* to 8*f* and 60*a* to 60*f*. For example, assume that instructor 4 is present in the overlap among first area 20 of sensing area 14*a*, first area 66 of sensing area 62*a*, and first area 66 of sensing area 62*b* and makes a gesture. Controller 26 identifies, as the gesture occurrence areas, first area 20 of sensing area 14*a*, first area 66 of sensing area 62*a*, and first area 66 of sensing area 62*b* based on results of reception by radio wave sensors 8*a*, 60*a*, and 60*b*.

[2-3. Operation of Gesture Recognition Device]

Figure 13:
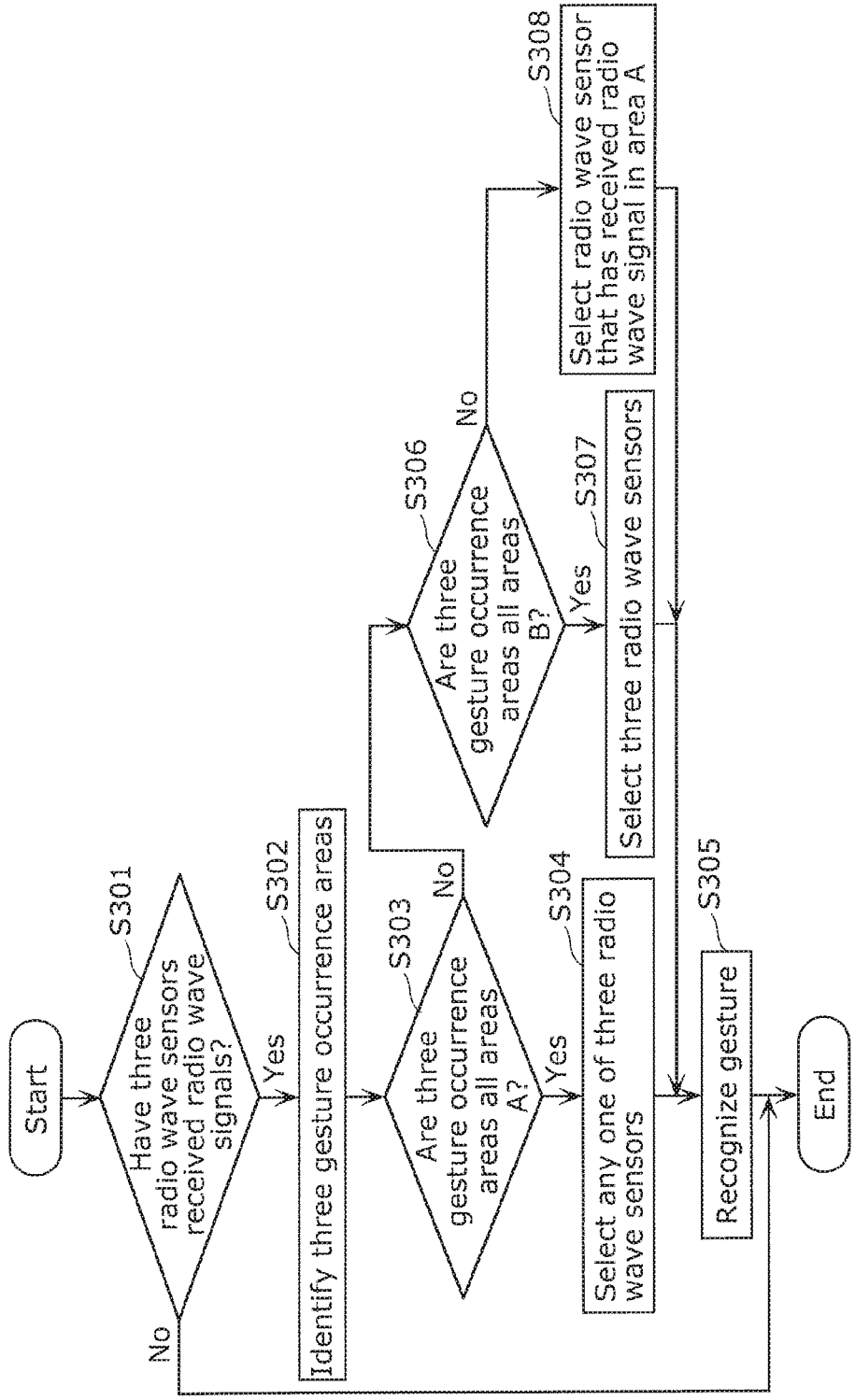
FIG. 13 is a flowchart showing a flow of an operation of the gesture recognition device according to Embodiment 2 where three radio wave sensors receive radio wave signals.

Now, an operation of gesture recognition device 2A where three (e.g., radio wave sensors 8*a*, 60*a*, and 60*b*) of the plurality of radio wave sensors 8*a* to 8*f* and 60*a* to 60*f* receive radio wave signals will be described with reference to FIG. 13. FIG. 13 is a flowchart showing a flow of the operation of gesture recognition device 2A according to Embodiment 2 where three radio wave sensors 8*a*, 60*a*, and 60*b* receive the radio wave signals.

As shown in FIG. 13, for example, if three radio wave sensors 8a, 60a, and 60b receive radio wave signals (YES in S301), controller 26A identifies the three gesture occurrence areas based on results of reception by three radio wave sensors 8a, 60a, and 60b (S302).

If none of three radio wave sensors 8a, 60a, and 60b receives radio wave signals (NO in S301), controller 26A ends the processing. On the other hand, if only any one of three radio wave sensors 8a, 60a, and 60b receives the radio wave signal (NO in S301), the processing of the flowchart shown in FIG. 8 is executed. In addition, if only any two of three radio wave sensors 8a, 60a, and 60b receive radio wave signals (NO in S301), the processing of the flowchart shown in FIG. 9 is executed.

Assume that instructor 4 is present in the overlap among first area 20 (i.e., area A) of sensing area 14a, first area 66 (i.e., area A) of sensing area 62a, and first area 66 (i.e., area A) of sensing area 62b and makes a gesture. The three identified gesture occurrence area are then first area 20 of sensing area 14a, first area 66 of sensing area 62a, and first area 66 of sensing area 62b (YES in S303). In this case, controller 26A selects any one (e.g., radio wave sensor 8a) of three radio wave sensors 8a, 60a, and 60b (S304). That is, controller 26A identifies, as the gesture occurrence area, any one of first area 20 of sensing area 14a, first area 66 of sensing area 62a, and first area 66 of sensing area 62b. At this time, controller 26A may select a predetermined one of three radio wave sensors 8a, 60a, and 60b or may select one of the radio wave sensors whose optical axis 16 or 64 is closest to the position of instructor 4. Recognition engine 28 recognizes the gesture of instructor 4 based on a result of reception only by selected one radio wave sensor 8a (S305).

In this embodiment, controller 26A selects any one of three radio wave sensors 8a, 60a, and 60b in step S304. The configuration is however not limited thereto. The controller may select any two (e.g., radio wave sensors 8a and 60a) of three radio wave sensors 8a, 60a, and 60b. At this time, controller 26A may select predetermined two of three radio wave sensors 8a, 60a, and 60b or may select two of the radio wave sensors whose optical axis 16 or 64 is closer to the position of instructor 4. In this case, recognition engine 28 recognizes the gesture of instructor 4 based on results of reception by selected two radio wave sensors 8a and 60a.

Returning to step S303, assume that instructor 4 is present in the overlap among second area 22 (i.e., area B) of sensing area 14a, second area 68 (i.e., area B) of sensing area 62a, and second area 68 (i.e., area B) of sensing area 62b and makes a gesture. The three identified gesture occurrence areas are then second area 22 of sensing area 14a, second area 68 of sensing area 62a, and second area 68 of sensing area 62b (NO in S303 and YES in S306). In this case, controller 26A selects all of three radio wave sensors 8a, 60a, and 60b (S307). Recognition engine 28 recognizes the gesture of instructor 4 based on results of reception by selected three radio wave sensors 8a, 60a, and 60b (S305).

In this embodiment, controller 26A selects all of three radio wave sensors 8a, 60a, and 60b in step S307. The configuration is however not limited thereto. The controller may select any two (or one) of three radio wave sensors 8a, 60a, and 60b. At this time, controller 26A may select predetermined two (or one) of three radio wave sensors 8a, 60a, and 60b or may select two (or one) of the radio wave sensors whose optical axis 16 or 64 is closer (or closest) to the position of instructor 4.

Returning to step S303, assume that instructor 4 is present in the overlap among first area 20 (i.e., area A) of sensing area 14a, first area 66 (i.e., area A) of sensing area 62a, and second area 68 (i.e., area B) of sensing area 62b and makes a gesture. The three identified gesture occurrence areas are then first area 20 of sensing area 14a, first area 66 of sensing area 62a, and second area 68 of sensing area 62b (NO in S303 and NO in S306). In this case, controller 26A selects any one (e.g., radio wave sensor 8a) of radio wave sensor 8a, which has received a radio wave signal in first area 20, and radio wave sensor 60a, which has received a radio wave signal in first area 66 (S308). That is, controller 26A identifies, as the gesture occurrence area, any one of first area 20 of sensing area 14a and first area 66 of sensing area 62a. At this time, controller 26A may select a predetermined one of two radio wave sensors 8a and 60a or may select one of the radio wave sensors whose optical axis 16 or 64 is closer to the position of instructor 4. Recognition engine 28 recognizes the gesture of instructor 4 based on a result of reception by selected radio wave sensor 8a (S305).

In this embodiment, controller 26A selects one radio wave sensor 8a of two radio wave sensors 8a and 60a in step S308. The configuration is however not limited thereto. The controller may select both of two radio wave sensors 8a and 60a. In this case, recognition engine 28 recognizes the gesture of instructor 4 based on results of reception by selected two radio wave sensors 8a and 60a.

Returning to step S303, assume that instructor 4 is present in the overlap among first area 20 (i.e., area A) of sensing area 14a, second area 68 (i.e., area B) of sensing area 62a, and second area 68 (i.e., area B) of sensing area 62b and makes a gesture. The three identified gesture occurrence areas are then first area 20 of sensing area 14a, second area 68 of sensing area 62a, and second area 68 of sensing area 62b (NO in S303 and NO in S306). In this case, controller 26A selects radio wave sensor 8a that has received a radio wave signal in first area 20 (S308). Recognition engine 28 recognizes the gesture of instructor 4 based on a result of reception by selected radio wave sensor 8a (S305).

[2-4. Advantages]

As described above, in this embodiment, the plurality of radio wave sensors 8a to 8f and the plurality of radio wave sensors 60a to 60f are arranged in two vertical stages in case 6. This configuration reduces vertical blind spots (areas B and C). As a result, gestures of instructor 4 can be highly accurately recognized.

Variations

The gesture recognition methods and the gesture recognition device according to one or more aspects of the present disclosure have been described above based on the embodiments. The present disclosure is however not limited to the embodiments. The one or more aspects of the present disclosure may include other embodiments, such as those obtained by variously modifying the embodiments as conceived by those skilled in the art or those achieved by freely combining the constituent elements in the embodiments without departing from the scope and spirit of the present disclosure.

For example, gesture recognition device 2 (or 2A) is mounted in the AI speaker in the embodiments described above. The configuration is however not limited thereto. The gesture recognition device may be mounted in various types of equipment such as a television receiver or an air conditioner.

Some or all of the constituent elements included in gesture recognition device 2 (or 2A) in the embodiments described above may constitute a single system large-scale integrated (LSI) circuit.

The system LSI is a super-multifunctional LSI manufactured by integrating a plurality of components into a single chip and specifically, a computer system including a microprocessor, a read-only memory (ROM), and a random-access memory (RAM), for example. The ROM sores computer programs. The microprocessor operates in accordance with the computer programs so that the system LSI fulfills the functions.

While the system LSI is named here, the circuit may also be referred to as an IC, an LSI, super-LSI, or ultra-LSI depending on the degree of integration. The circuit integration technology is not limited to the LSI and may be a dedicated circuit or a general-purpose processor. In addition, a field programmable gate array (FPGA) programmable after the manufacture of an LSI circuit or a reconfigurable processor capable of reconfiguring the connections or settings of circuit cells inside an LSI may be employed.

Appearing as an alternative circuit integration technology to the LSI, another technology that progresses or deprives from the semiconductor technology may be used for integration of functional blocks. Application of biotechnology can be considered.

The constituent elements of the gesture recognition device according to the embodiments described above may be distributed into a plurality of devices connected via a communication network.

One aspect of the present disclosure may be directed not only to such gesture recognition device 2 (or 2A) but also a gesture recognition method including, as steps, the characteristic constituent elements of gesture recognition device 2 (or 2A). Alternatively, another aspect of the present disclosure may be directed to computer programs that cause a computer to execute the characteristic steps included in the gesture recognition method. Further another aspect of the present disclosure may be directed to a non-transitory computer-readable recording medium storing such computer programs.

In the embodiments described above, the constituent elements may be dedicated hardware or may be achieved by executing software programs suitable for the constituent elements. The constituent elements may be achieved by a program executor such as a CPU or a processor reading and executing software programs stored in a storage medium such as a hard disk or a semiconductor memory.

INDUSTRIAL APPLICABILITY

The gesture recognition device according to the present disclosure is applicable as a user interface mounted in an AI speaker, for example.

The invention claimed is:

1. A gesture recognition method for recognizing a gesture of a moving body, using a plurality of radio wave sensors each associated with a different one of a plurality of sensing areas each being an area for sending a radio wave signal toward a single moving body and receiving the radio wave signal reflected by the single moving body,
the plurality of radio wave sensors including at least two radio wave sensors having respective sensing areas sharing an area in which radio wave signals transmitted by the at least two radio wave sensors overlap each other,
the gesture recognition method comprising:
(a) identifying, as a gesture occurrence area in which the single moving body has made a gesture, at least two sensing areas among the plurality of sensing areas based on results of reception by the plurality of radio wave sensors; and
(b) recognizing the gesture based on a result of reception by at least one radio wave sensor associated with any of the at least two sensing areas identified as the gesture occurrence area among the plurality of radio wave sensors, wherein
in the recognizing (b), a number of the at least one radio wave sensor is determined based on results of reception by at least two radio wave sensors associated with the at least two sensing areas identified as the gesture occurrence area.

2. The gesture recognition method according to claim 1, wherein each of the plurality of sensing areas includes:
a first area spreading from an optical axis of one of the radio wave sensors associated with the sensing area; and
a second area spreading from the optical axis beyond the first area,
the identifying (a) includes determining where the gesture is made in the at least two sensing areas,
(i) when it is determined in the identifying (a) that the gesture is made in an area in which the first area of one sensing area and the second area of another sensing area adjacent to the one sensing area overlap each other,
in the recognizing (b), the gesture is recognized based on a result of reception by one radio wave sensor associated with the one sensing area including the first area, and
(ii) when it is determined in the identifying (a) that the gesture is made in an area in which the second area of one sensing area and the second area of another sensing area adjacent to the one sensing area overlap each other,
in the recognizing (b), the gesture is recognized based on results of reception by two radio wave sensors associated with the one sensing area and the other sensing area.

3. The gesture recognition method according to claim 1, wherein each of the plurality of sensing areas includes:
a first area spreading from an optical axis of one of the radio wave sensors associated with the sensing area; and
a second area spreading from the optical axis beyond the first area,
the identifying (a) includes determining where the gesture is made in the at least two sensing areas,
(i) when it is determined in the identifying (a) that the gesture is made in an area in which the first area of one sensing area and the first area of another sensing area adjacent to the one sensing area overlap each other,
in the recognizing (b), the gesture is recognized based on a result of reception by one radio wave sensor associated with one of the one sensing area and the other sensing area, and
(ii) when it is determined in the identifying (a) that the gesture is made in an area in which the second area of one sensing area and the second area of another sensing area adjacent to the one sensing area overlap each other,
in the recognizing (b), the gesture is recognized based on results of reception by two radio wave sensors associated with the one sensing area and the other sensing area.

4. The gesture recognition method according to claim 3, wherein
(iii) when it is determined in the identifying (a) that the gesture is made in an area in which the first area of one sensing area and the second area of another sensing area adjacent to the one sensing area overlap each other, in the recognizing (b), the gesture is recognized based on a result of reception by one radio wave sensor associated with the one sensing area including the first area.

5. The gesture recognition method according to claim 1, wherein each of the plurality of sensing areas includes:
a first area spreading from an optical axis of one of the radio wave sensors associated with the sensing area; and
a second area spreading from the optical axis beyond the first area,
the identifying (a) includes determining where the gesture is made in the at least two sensing areas,
in the identifying (a), the at least two sensing areas include three sensing areas adjacent to each other,
(i) when it is determined in the identifying (a) that the gesture is made in an area in which the first area of at least one sensing area in the three sensing areas and the second area of a remaining sensing area other than the at least one sensing area among the three sensing areas overlap each other,
in the recognizing (b), the gesture is recognized based on a result of reception by one radio wave sensor associated with one of the at least one sensing area including the first area, and
(ii) when it is determined in the identifying (a) that the gesture is made in an area in which the second areas of the three sensing areas overlap each other,
in the recognizing (b), the gesture is recognized based on results of reception by three radio wave sensors associated with the three sensing areas.

6. The gesture recognition method according to claim 1, wherein each of the plurality of sensing areas includes:
a first area spreading from an optical axis of one of the radio wave sensors associated with the sensing area; and
a second area spreading from the optical axis beyond the first area,
the identifying (a) includes determining where the gesture is made in the at least two sensing areas,
in the identifying (a), the at least two sensing areas include three sensing areas adjacent to each other,
(i) when it is determined in the identifying (a) that the gesture is made in an area in which the first areas of the three sensing areas overlap each other,
in the recognizing (b), the gesture is recognized based on a result of reception by one radio wave sensor associated with one of the three sensing areas, and
(ii) when it is determined in the identifying (a) that the gesture is made in an area in which the second areas of the three sensing areas overlap each other,
in the recognizing (b), the gesture is recognized based on results of reception by three radio wave sensors associated with the three sensing areas.

7. The gesture recognition method according to claim 6, wherein
(iii) when it is determined in the identifying (a) that the gesture is made in an area in which the first area of at least one sensing area in the three sensing areas and the second area of a remaining sensing area other than the at least one sensing area among the three sensing areas overlap each other,
in the recognizing (b), the gesture is recognized based on a result of reception by one radio wave sensor associated with one of the at least one sensing area including the first area.

8. The gesture recognition method according to claim 1, wherein each of the plurality of sensing areas includes:

a first area spreading from an optical axis of one of the radio wave sensors associated with the sensing area; and
a second area spreading from the optical axis beyond the first area,
in the recognizing (b), the gesture is recognized using a recognition engine subjected to machine learning in advance by inputting, to each of the plurality of radio wave sensors, a radio wave signal indicating a gesture in each of the first area and the second area included in one of the plurality of sensing areas associated with the radio wave sensor.

9. A gesture recognition method for recognizing a gesture of a moving body, using a plurality of radio wave sensors each associated with a different one of a plurality of sensing areas each being an area for sending a radio wave signal toward a single moving body and receiving the radio wave signal reflected by the single moving body,
the plurality of radio wave sensors being arranged on a side surface of a case rotatable about a rotation axis, in a rotation direction of the case, and
the gesture recognition method comprising:
(a) identifying, as a gesture occurrence area in which the single moving body has made a gesture, one sensing area among the plurality of sensing areas based on results of reception by the plurality of radio wave sensors;
(b) recognizing the gesture based on a result of reception by one radio wave sensor associated with the one sensing area identified as the gesture occurrence area; and
(c) rotating the case based on the result of reception by the one radio wave sensor.

10. The gesture recognition method according to claim 9, wherein
in the rotating (c), the case is rotated to cause an optical axis of the one radio wave sensor to approach the single moving body based on the result of reception by the one radio wave sensor.

11. The gesture recognition method according to claim 9, wherein each of the plurality of sensing areas includes:
a first area spreading from an optical axis of one of the radio wave sensors associated with the sensing area; and
a second area spreading from the optical axis beyond the first area,
the identifying (a) includes determining one of the first area and the second area included in the one sensing area among the plurality of sensing areas as the gesture occurrence area based on the results of reception by the plurality of radio wave sensors, and
when it is determined in the identifying (a) that the second area included in the one sensing area is identified as the gesture occurrence area,
in the rotating (c), the case is rotated to cause the first area included in of the one sensing area to overlap the gesture occurrence area.

12. A gesture recognition device for recognizing a gesture, the device comprising:
a plurality of radio wave sensors each of which sends and receives a radio wave signal, the plurality of radio wave sensors each being associated with a different one of a plurality of sensing areas each being an area for sending the radio wave signal toward a single moving body and receiving the radio wave signal reflected by the single moving body;

a controller that identifies, as a gesture occurrence area in which the single moving body has made a gesture, at least two sensing areas among the plurality of sensing areas based on results of reception by the plurality of radio wave sensors; and a recognition engine that recognizes the gesture based on a result of reception by at least one radio wave sensor associated with any of the at least two sensing areas identified by the controller as the gesture occurrence area among the plurality of radio wave sensors, wherein the plurality of radio wave sensors include at least two radio wave sensors having respective sensing areas sharing an area in which radio wave signals transmitted by the at least two radio wave sensors overlap each other, and the recognition engine determines a number of the at least one radio wave sensor used in the recognition, based on results of reception by at least two radio wave sensors associated with the at least two sensing areas identified by the controller as the gesture occurrence area.

13. The gesture recognition device according to claim 12, wherein each of the plurality of sensing areas includes:
a first area spreading from an optical axis of one of the radio wave sensors associated with the sensing area; and
a second area spreading from the optical axis beyond the first area,
the controller determines where the gesture is made in the at least two sensing areas,
(i) when the controller determines that the gesture is made in an area in which the first area of one sensing area and the second area of another sensing area adjacent to the one sensing area overlap each other,
the recognition engine recognizes the gesture based on a result of reception by one radio wave sensor associated with the one sensing area including the first area, and
(ii) when the controller determines that the gesture is made in an area in which the second area of one sensing area and the second area of another sensing area adjacent to the one sensing area overlap each other,
the recognition engine recognizes the gesture based on results of reception by two radio wave sensors associated with the one sensing area and the other sensing area.

14. The gesture recognition device according to claim 12, wherein each of the plurality of sensing areas includes:
a first area spreading from an optical axis of one of the radio wave sensors associated with the sensing area; and
a second area spreading from the optical axis beyond the first area,
the controller determines where the gesture is made in the at least two sensing areas,
(i) when the controller determines that the gesture is made in an area in which the first area of one sensing area and the first area of another sensing area adjacent to the one sensing area overlap each other,
the recognition engine recognizes the gesture based on a result of reception by one radio wave sensor associated with one of the one sensing area and the other sensing area, and
(ii) when the controller determines that the gesture is made in an area in which the second area of one sensing area and the second area of another sensing area adjacent to the one sensing area overlap each other,
the recognition engine recognizes the gesture based on results of reception by two radio wave sensors associated with the one sensing area and the other sensing area.

15. The gesture recognition device according to claim 14, wherein
(iii) when the controller determines that the gesture is made in an area in which the first area of one sensing area and the second area of another sensing area adjacent to the one sensing area overlap each other,
the recognition engine recognizes the gesture based on a result of reception by one radio wave sensor associated with the one sensing area including the first area.

16. The gesture recognition device according to claim 12, wherein each of the plurality of sensing areas includes:
a first area spreading from an optical axis of one of the radio wave sensors associated with the sensing area; and
a second area spreading from the optical axis beyond the first area,
the controller determines where the gesture is made in the at least two sensing areas,
the at least two sensing areas include three sensing areas adjacent to each other,
(i) when the controller determines that the gesture is made in an area in which the first area of at least one sensing area in the three sensing areas and the second area of a remaining sensing area other than the at least one sensing area among the three sensing areas overlap each other,
the recognition engine recognizes the gesture based on a result of reception by one radio wave sensor associated with one of the at least one sensing area including the first area, and
(ii) when the controller determines that the gesture is made in an area in which the second areas of the three sensing areas overlap each other,
the recognition engine recognizes the gesture based on results of reception by three radio wave sensors associated with the three sensing areas.

17. The gesture recognition device according to claim 12, wherein each of the plurality of sensing areas includes:
a first area spreading from an optical axis of one of the radio wave sensors associated with the sensing area; and
a second area spreading from the optical axis beyond the first area,
the controller determines where the gesture is made in the at least two sensing areas,
the at least two sensing areas include three sensing areas adjacent to each other,
(i) when the controller determines that the gesture is made in an area in which the first areas of the three sensing areas overlap each other,
the recognition engine recognizes the gesture based on a result of reception by one radio wave sensor associated with one of the three sensing areas, and
(ii) when the controller determines that the gesture is made in an area in which the second areas of the three sensing areas overlap each other,
the recognition engine recognizes the gesture based on results of reception by three radio wave sensors associated with the three sensing areas.

18. The gesture recognition device according to claim 17, wherein
(iii) when the controller determines that the gesture is made in an area in which the first area of at least one sensing area in the three sensing areas and the second area of a remaining sensing area other than the at least one sensing area among the three sensing areas overlap each other, the recognition engine recognizes the gesture based on a result of reception by one radio wave sensor associated with one of the at least one sensing area including the first area.

19. The gesture recognition device according to claim 12, wherein each of the plurality of sensing areas includes:
a first area spreading from an optical axis of one of the radio wave sensors associated with the sensing area; and
a second area spreading from the optical axis beyond the first area,
the recognition engine recognizes the gesture using a recognition engine subjected to machine learning in advance by inputting, to each of the plurality of radio wave sensors, a radio wave signal indicating a gesture in each of the first area and the second area included in one of the plurality of sensing areas associated with the radio wave sensor.

20. A gesture recognition device for recognizing a gesture, the device comprising:
a plurality of radio wave sensors each of which sends and receives a radio wave signal, the plurality of radio wave sensors each being associated with a different one of a plurality of sensing areas each being an area for sending the radio wave signal toward a single moving body and receiving the radio wave signal reflected by the single moving body;
a controller that identifies, as a gesture occurrence area in which the single moving body has made a gesture, one sensing area among the plurality of sensing areas based on results of reception by the plurality of radio wave sensors; and a recognition engine that recognizes the gesture based on a result of reception by one radio wave sensor associated with the one sensing area identified by the controller as the gesture occurrence area, wherein the plurality of radio wave sensors are arranged on a side surface of a case rotatable about a rotation axis, in a rotation direction of the case, and the controller rotates the case based on the result of reception by the one radio wave sensor.

21. The gesture recognition device according to claim 20, wherein
the controller rotates the case to cause an optical axis of the one radio wave sensor to approach the single moving body based on the result of reception by the one radio wave sensor.

22. The gesture recognition device according to claim 20, wherein each of the plurality of sensing areas includes:
a first area spreading from an optical axis of one of the radio wave sensors associated with the sensing area; and
a second area spreading from the optical axis beyond the first area,
the controller determines one of the first area and the second area included in the one sensing area among the plurality of sensing areas as the gesture occurrence area based on the results of reception by the plurality of radio wave sensors, and
when the controller determines the second area included in the one sensing area as the gesture occurrence area, the controller rotates the case to cause the first area included in of the one sensing area to overlap the gesture occurrence area.

* * * * *